United States Patent [19]

Johnson et al.

[11] 4,342,517
[45] Aug. 3, 1982

[54] METHOD AND ARRANGEMENT FOR THE MEASUREMENT OF ROTATIONS BY THE SAGNAC EFFECT

[75] Inventors: Mark Johnson, Wigan, England; Reinhard Ulrich, Leonberg, Fed. Rep. of Germany

[73] Assignee: Max-Planck-Gesellschaft zur Forderung der Wissenschaften e.V., Fed. Rep. of Germany

[21] Appl. No.: 111,852

[22] Filed: Jan. 14, 1980

[30] Foreign Application Priority Data

Jan. 15, 1977 [DE] Fed. Rep. of Germany ....... 2901388

[51] Int. Cl.$^3$ .............................................. G01B 9/02
[52] U.S. Cl. .................................... 356/350; 356/351
[58] Field of Search ................................ 356/350, 351

[56] References Cited

U.S. PATENT DOCUMENTS 4,259,016 3/1981 Schoffner ........................ 356/350

Primary Examiner—John K. Corbin
Assistant Examiner—Matthew W. Koren
Attorney, Agent, or Firm—Craig and Antonelli

[57] ABSTRACT

In order to permit the measurement of very small rotation rates, the rotation rates are measured by the Sagnac effect in a light path encircling an area. To accomplish this, two coherent light beams are coupled into the two ends of said light path of which a section is subject to perturbations that affect the polarizations of said two light beams. After the beams emerge again from the ends of said fiber, they are superimposed so that they interfere. The rotation rate of said light path can then be evaluated from an analysis of the interference. In particular, in order to reduce sensitivity to the perturbations, the two light beams are coupled with defined states of polarization into said light path of which a section is subject to perturbations, and the two interfering beams pass through at least one polarization analyzer, the azimuth and ellipticity of which is adjusted for maximum transmission of light which is the conjugate of one of said light beams coupled into said light path at one end thereof. An automatic control system, responding to variations of polarization, is used to maintain a stable state of polarization of at least one of said two light beams emerging from said perturbed section of said light path, said stable state of polarization being distinctly different from that state which is blocked by said polarization-analyzer.

16 Claims, 3 Drawing Figures

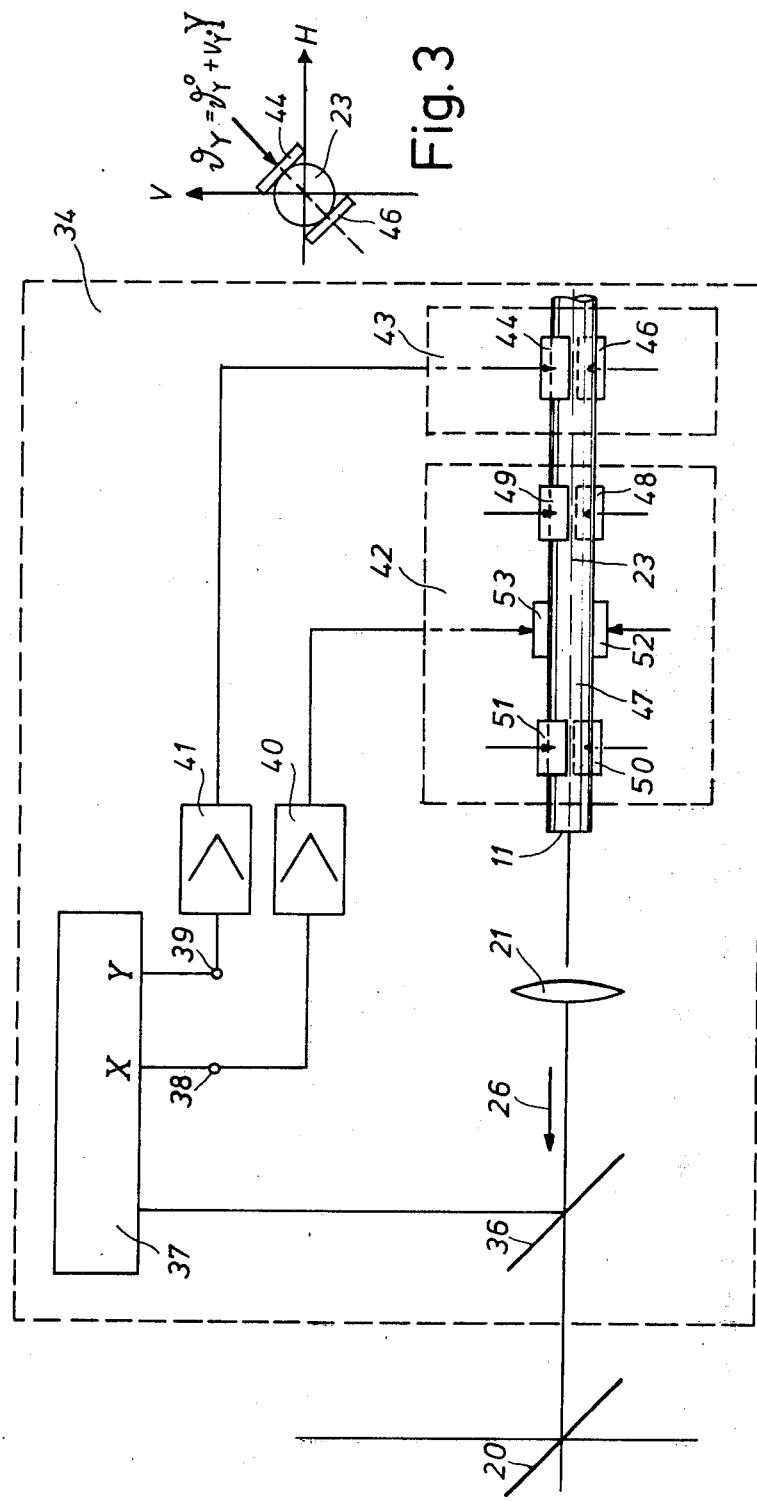

METHOD AND ARRANGEMENT FOR THE MEASUREMENT OF ROTATIONS BY THE SAGNAC EFFECT

The invention relates to a method for the measurement of rotations by the Sagnac effect in a closed light path encircling an area, employing two coherent light beams which are coupled into the two ends of said light path of which a section is subject to perturbations that affect the polarizations of said two light beams which, after they emerge again from the ends of said fiber, are superimposed so that they interfere, the rotation rate of said light path being evaluated from an analysis of the interference, and to an arrangement for carrying out this method.

The method and pertaining devices permit the measurement of very small rotation rates, for example in the range of 0.1 deg/sec and below. The sensitivity of the devices increases if a longer light path and a larger area are used. The measurement is based on the phase difference $2\phi$ appearing between two coherent light beams which propagate in opposite directions along the light path. This phase difference is proportional to the rotation rate $\Omega$ of the light path about an axis normal to the encircled area. Thus, $\Omega$ can be determined from $2\phi$. This phase difference is measured interferometrically from the spatial intensity distribution of the interference pattern resulting from a superposition of the two light beams. For practical applications of such devices it is important to keep the overall size small, yet achieving a high sensitivity. Therefore, the major part of the closed light path is defined by a light-guiding optical fiber, laid out in many turns. In this way, the encircled area, i.e. the product of the actual area times the number of turns, can be made large even with a relatively small overall size. This principle has been described by V. Vali and R. W. Shorthill in Applied Optics, vol. 16 (1977), p. 290 and p. 2605.

In actual tests of such a fiber-optical rotation sensor, however, severe instabilities of the interference pattern have been observed. They prevent a unique evaluation of the phase difference and, therefore, of the rotation rate. These instabilities become worse if the sensitivity of the device is increased. For these reasons, fiber-optical rotation sensors have not found practical application hitherto.

Systematic investigations of the instabilities have shown the reason for the instabilities and have led to the present invention:

An optical fiber, even a so-called monomode fiber, can support in each direction of propagation at least two modes of mutually orthogonal polarization, and usually these two modes propagate at slightly different velocities along the fiber. In analogy, to the equivalent effect in crystals, the fiber is therefore called birefringent. In practice, small mechanical forces act on the fiber, like lateral pressure, bending and torsional moments, or internal stress that may vary with temperature.

These forces couple the two modes of the fiber, so that light propagates partially in the slow mode and partially in the fast one. As a result, the optical lengths of the fiber, measured in the two opposite directions of propagation, may be different, and moreover they change in time because the mentioned coupling effects are not constant. As a consequence, uncontrolled and variable phase differences result between the two counter-propagating beams in the rotation sensor, and those phase differences cannot be distinguished in the known interferometers from the phase difference $2\phi$ resulting by the Sagnac effect from the rotation to be measured.

Starting from a method of the initially given kind, it is a first object of the invention to provide an improved method which is insensitive against said perturbations, and it is a second object of the invention to provide an arrangement for carrying out the improved method.

In view of the first object of the invention, the improvements as provided by the method according to the invention, consist in that the two coherent light beams are coupled with defined states of polarization into the light path of which a section is subject to perturbations and that said two interfering light beams are guided through at least one polarization analyzer, azimuth and ellipticity of which are adjusted for maximum transmission of light which is the conjugate of one of said light beams coupled into said light path at one end thereof.

Useful and advantageous modifications of this method are specified in detail in claims 2-5.

With respect to the second object of the invention, in an arrangement for the measurement of rotation rates employing a light path that encircles an area and a Sagnac interferometer that rotates at the rate to be measred, said light path being defined at least partially by an optical fiber, the improvements according to the invention are characterized in that at least one polarizer is inserted in that part of said light path which leads from the light source to both ends of said fiber, and that polarization-analyzer is provided in the path of said two interfering beams emerging from the ends of said fiber, azimuth and ellipticity of said analyzer being adjusted for maximum transmission of light which is the conjugate of one of said light beams coupled into said light path at one end thereof, and that an automatic control system is provided which responds to the state of polarization of one of said two interfering light beams which emerges from one end of said fiber, said control system maintaining the polarization of said light beam emerging from said fiber in a state which is distinctly different from the state which is blocked by said analyzer.

In the remaining claims 7-17 advantageous details and alternative modifications of the basic arrangement of this invention are disclosed.

According to this invention, polarizing elements are inserted into the basic interferometer. They are adjusted so that the light forming the interference pattern is propagating in only one of the two possible modes of the fiber. By the principle of reciprocity, this condition remains fulfilled even in the presence of slowly varying mechanical perturbations of the fiber. The advantage of this method is that the perturbations do no longer affect the spatial structure of the interference pattern. The pattern is stable, and the phase $2\phi$ and the rotation rate $\Omega$ can be evaluated with higher accuracy.

In a preferable embodiment of this invention, a polarization control loop is employed. It has the advantage of maintaining a high and stable optical signal at the detectors even in the presence of mechanical perturbations of the fiber, thus also permitting a reliable measurement of the rotation rate.

Experiments with a simple laboratory set-up have verified that the interference pattern remains indeed unaffected by the mentioned perturbations. Therefore, this invention is an essential precondition for the construction of a practically applicable fiber-optical rotation sensor.

BRIEF DESCRIPTION OF THE DRAWINGS

Further features and advantages of the invention become apparent from the following detailed description and from the drawings, in which

FIG. 2 is a partially pictorial and partially block-diagrammatic illustration of the control system used for the stabilization of the polarization of the interfering light beams; and FIG. 3 shows a detail of the polarization controlling element of the control system of FIG. 2.

DESCRIPTION OF THE ILLUSTRATIVE EMBODIMENTS

Figure 1:
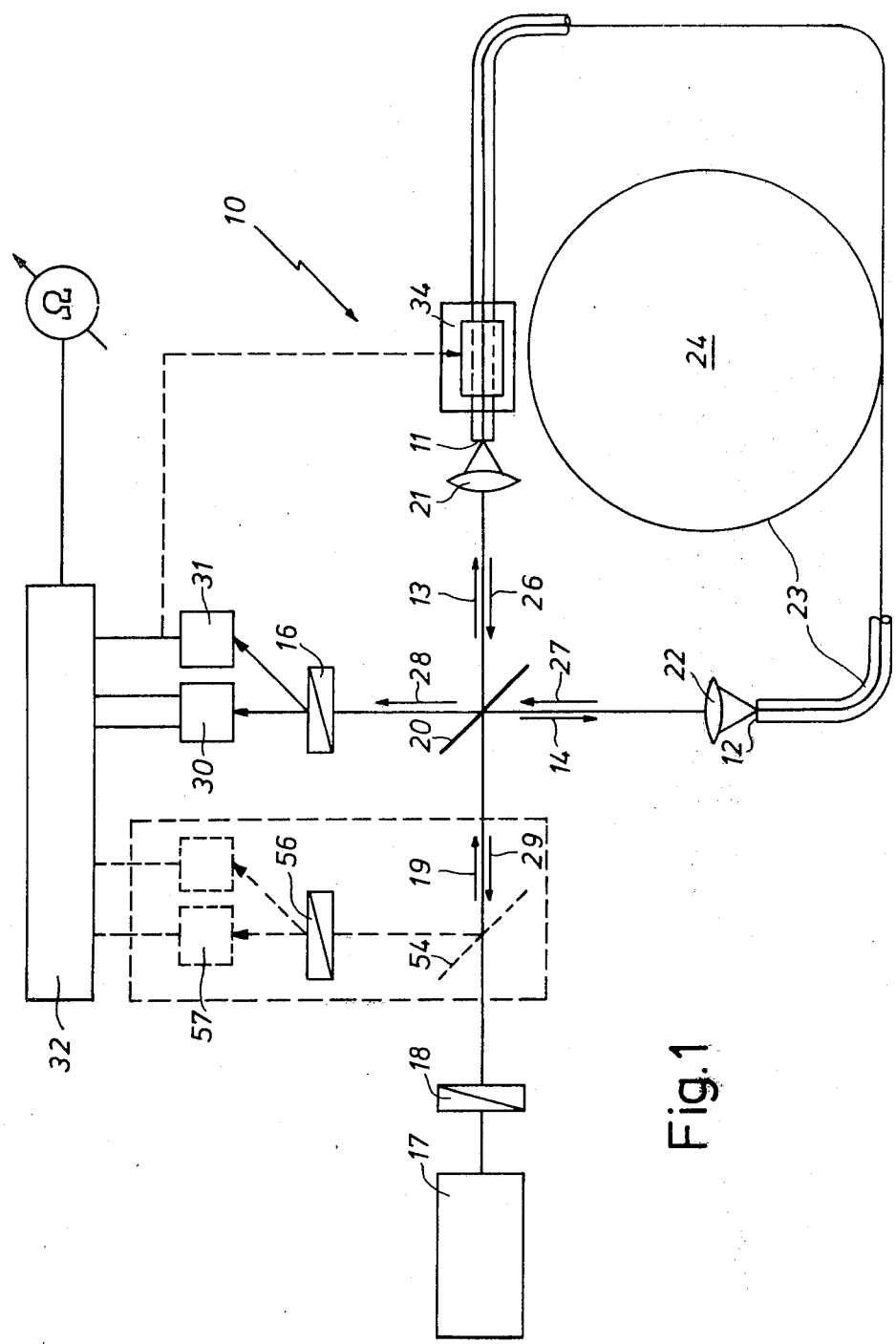
FIG. 1 shows in full lines a block-diagrammatic illustration of the basic Sagnac interferometer, equipped with polarizing elements according to the invention, and showing in dashed lines the additions included in another embodiment.

Two specific embodiments of a fiber-optical Sagnac interferometer for the measurement of rotation rates are shown in FIG. 1. They differ from other, known interferometers of this kind, described e.g. by Vali and Shorthill in Applied Optics Vol. 16 (1977), p. 290 and p. 26. The differences exist in the method, by which the rotation rate is determined, as well as in the presence of polarizing elements in the interferometer which are adjusted in a specific way. They provide a well defined state of polarization for the two light beams which are represented by the arrows 13 and 14 and which are coupled into the two ends 11 and 12 of an optical fiber. Moreover, at least one analyzer 16 is provided to select a single state of polarization which alone is used for the evaluation of the rotation rate.

In the following, that embodiment of the Sagnac interferometer is discussed first whose optical rays are depicted by full lines in FIG. 1.

A light source 17, preferably a laser, emits monochromatic light. Unless this light happens to be fully and stably polarized, a polarizer 18 is provided. It passes a light beam, represented by the arrow 19, which has a well defined state of polarization and serves as the input beam of the interferometer. The main beamsplitter 20 splits the input beam 19 into two coherent light beams 13 and 14 of approximately equal intensities. For simplicity, the beamsplitter is assumed here as a semitransparent, lossless mirror. The beams 13 and 14 are entering a closed light path 20, 23, 20, encircling an area 24. This light path is defined along its major part by an optical fiber 23, and the two light beams 13 and 14 are coupled into the two ends 11, 12 of that fiber by suitable coupling elements, e.g. by the lenses 21 and 22. The light beams 13 and 14 propagate along the light path 20,23,20 in opposite directions. When they emerge again from the fiber ends 12 and 11, these beams 13 and 14 are represented by the arrows 27 and 26. They are recombined by the main beamsplitter 20, so that they can interfere. Two output light fluxes result, represented by the arrows 28 and 29. The light flux 28 falls on the analyzer 16. According to this invention, the analyzer 16 is of such a type and orientation that it passes only that polarization component of the light flux 28 which is suitable for an unperturbed evaluation of $\Omega$. This component falls on a detector unit 30. The orthogonal polarization component, unsuitable for the evaluation of $\Omega$, is deflected onto a detector 31 which is positioned separate from the detector unit 30. What polarization component is suitable and is to be selected by the analyzer 16, is defined here by the following instruction for the correct adjustment of the analyzer 16: When a plane mirror (not shown in FIG. 1) is placed at the position of the fiber end 11 and is adjusted so that it reflects the light beam 13 back into itself as beam 26, the light flux 28 has the suitable polarization. The analyzer 16 must be adjusted so that it passes this light flux fully to the detector 30, whereas the detector 31 must not receive any light. The other beam 14 must be blocked during this adjustment.

This definition of the suitable polarization component applies to the particularly most important case where the light beam 13 has linear polarization. In a more general situation, where the beam 13 has elliptical or circular polarization, the reflection of beam 13 back into itself by a plane mirror in the above instruction must be replaced by the requirement that for the adjustment of polarizer 16 the returning beam 26 should be the so-called conjugate of the input beam 13, while the other beam 14 is blocked. By the conjugate of a light beam another light beam is meant in whose mathematical representation the signs of all space coordinates are reserved. The conjugate beam, therefore, has the same spatial intensity distribution and polarization as the original beam, but it is propagating in the opposite direction. If the original beam is polarized linearly, the conjugate beam has the same linear polarization. The conjugate of an e.g. left circular polarized beam is also left circular, as seen in both cases by an observer looking into the direction from where the light comes. In practice, for the purpose of the above-mentioned instruction for adjustment of the polarizer 16, the conjugate beam of an elliptical input beam 13 is generated most conveniently by a combination of an adjustable retarder, e.g. a Soleil-Babinet compensator, and a plane mirror. The retarder is placed in the beam 13 at a position where this beam is parallel, e.g. between the main beamsplitter 20 and the lens 21. The azimuth and the retardation of the retarder are adjusted until the polarization of the beam 13 is linear at the fiber end 11. If this fiber end is replaced now with the plane mirror, the required conjugate beam is returning to the main beamsplitter and the polarizer 16 can be adjusted for minimum signal at detector 31.

The detector unit 30, receiving the suitable polarization component, produces electrical output signals which are characteristic for the phase difference $2\phi$ of the two interfering light beams. The interference pattern falling on the detector unit 30 may be, for example, a system of circular fringes. The radius of each ring corresponds to a certain phase difference. With an array of detectors, measuring the radial intensity distribution in the ring system, the phase difference $2\phi$ can be determined. In the simplest embodiment, represented in FIG. 1, it is assumed that the detector unit 30 has only two photodiodes which are arranged so in the ring system that their output signals are in phase quadrature. This means that the phase difference of the two interfering light beams at the position of the first detector in the interference pattern differs, by 90° from their phase difference at the position of the second detector.

An interferometer 10 that has been adjusted according to the instruction described above, is operating in the following way. When the interferometer 10 and, with it, the light path 20,23,20 and the encircled area 24 start rotating, the Sagnac effect produces a relative phase shift $2\phi$ between the output light beams 26 and 27 of the fiber.

$$2\phi = 8\pi \Omega F/\lambda c. \tag{1}$$

In this equation F is the encircled area. It is equal to the sum of the areas defined by the individual turns of the optical fiber 23. The quantity $\Omega$ is that component of the angular velocity of the interferometer which is normal to the encircled area; and $\lambda$ and c denote the wave length and velocity of the light in free space.

Due to the appearance of the phase shift 2 $\phi$, the intensities of the light fluxes change that fall on the detector unit 30 and the detector 31.

A problem with fiber-optical Sagnac interferometers for the measurement of rotations is the variation of the detector signals due to other reasons than the rotation. Various perturbations, like lateral forces, bending and torsional moments, and temperature variations act on the fiber and may change its birefringence. As a result, the detector signals fluctuate. In the known interferometers, it is not possible to distinguish such fluctuations from those variations of the detector signals that are caused by changes of the rotation rate to be measured. Yet, the electronic system 32 must be able to evaluate the output signals of the detectors and to generate an output signal that is proportional to the rotation rate.

According to this invention, the presence and adjustment of the polarizer 18 and analyzer 16, or of equivalent means, have the effect that the interference pattern (e.g. the system of rings) has a geometrical configuration which is independent of the mentioned perturbations of the fiber. Therefore, the geometrical configuration is changing only with variations of the phase 2 $\phi$ caused by the rotation. It is possible, therefore, to determine this phase shift 2 $\phi$ and the rotation rate $\Omega$ from the changes of the geometrical configuration of the interference pattern in the detector unit 30. Whereas the use of polarized light beams stabilizes the geometrical configuration of the interference pattern, as described, it does not preclude the possibility of intensity variations of the entire interference pattern by the mentioned perturbations. If the analyzer 16 is properly adjusted, such intensity variations can occur only by the same factor at all points of the interference pattern.

In unfavorable moments it may happen that the mentioned perturbations reduce the intensity of the entire interference pattern below the limits of detection of the unit 30, so that an evaluation of the rotation rate $\Omega$ becomes impossible. In those moments, the polarization of the light flux 28 is so that it cannot pass the analyzer 16. In order to prevent such occurences and to guarantee that the interference pattern has at all times an intensity sufficient for the evaluation, a polarization control system 34 is provided by this invention. This system maintains the polarization of the beam 26, emerging from the fiber end 11, at a state which is sufficiently different from the state that would be blocked by the analyzer 16.

The control system adjusts automatically the polarizations of the two interfering output beams by a control element that changes the birefringence in the light path 20,23,20 of the interferometer. The error signal for the control may conveniently be taken from the output of the detector 31, and the control strategy is minimization of this signal. The position of the controlling element along the light path is basically arbitrary, it may be chosen so as to facilitate the necessary polarization changes of the interfering beams.

The system shown in FIG. 2 is one embodiment of a control system 34 that can be used in the Sagnac interferometer 10 according to the invention. This system responds only to the state of polarization of the light beam 26, emerging from the fiber end 11, and it controls the birefringence of the fiber 23 in the immediate vicinity of this end 11, maintaining there a stable state of polarization of beam 26. This state must be the one that passes with maximum transmission through the analyzer 16 to the detector unit 30. To simplify the discussion it is assumed here that this selected reference state of polarization is linear and horizontal, i.e. having an azimuth parallel to the plane defined by the beams 26,27 and 28. According to the instruction for adjustment given earlier, this choice of the reference state of polarization implies that the polarizer 18, too, is set to pass linear horizontal polarization.

The control system of FIG. 2 contains two independent control loops. The need for two loops is recognized by noting that the mentioned perturbations of the fiber 23 and other perturbations of the optical system will cause in general an elliptical state of polarization of the light beam arriving in the fiber at its end 11. This elliptical polarization may differ from the reference state in the azimuth X of its linear polarization component, as well as in the existence of a circular polarization component Y that yields the elliptical state of the light arriving at the end 11. The purpose of the two control loops, then, is to minimize these two components X and Y of the deviation from the reference state. To this end, the control system 34 is constructed as follows.

An auxiliary beamsplitter 36, represented in FIG. 2 as a partially transparent mirror, splits off a small fraction (appr. 10–20%) of the power of beam 26 after it has emerged from the fiber end 11. This fraction is directed into a polarimeter 37. At its first output 38 an electrical error signal is generated which is proportional to the azimuthal deviation X of the polarization of beam 26 from the chosen horizontal reference polarization. The error signal at the second output 39 is proportional to the ellipticity of the polarization of beam 26, i.e. to its component of circular polarization. These electrical error signals, representing X and Y, are amplified in control amplifiers with suitable proportional-plus-integral response characteristics. The output of the amplifiers are connected to control units 42 and 43, respectively, permitting independent compensation of the deviations X and Y. The proper choice of the response characteristics of the amplifiers is possible without problems to those skilled in the art if the response characteristics of the polarimeter 37 and the control elements 42,43 are taken into account. Moreover, this choice is determined by the temporal characteristics of the perturbations of polarization, by the tolerable deviations from the reference polarization, and by economical considerations.

The polarization controlling element in the control unit 43 operates by exerting a lateral force on the fiber 23. The force is produced electro-magnetically or piezo-electrically and is represented in FIG. 3 only by the two jaws 44 and 46. These jaws press with a force $\theta_Y$ on the fiber in a direction that includes a 45° angle with the plane of reference polarization. The force $\theta_Y$ is the sum of a constant bias force $\theta_y°$ and of a second component that is proportional to the variable deviation Y, amplified with the gain factor $v_Y$ of the amplifier 41. Depending upon the momentary perturbations, the Y error signal and, therefore, that second force component, may have a positive or a negative sign. In order to ensure that the force $\theta_Y$ remains always positive, i.e. a pressure, the bias component $\theta_Y{}^\circ$ must be chosen larger than the maximum amplitude of the variable component. The force $\theta_Y$ produces elastic stress in the fiber and, therefore, an electronically controllable, uniaxial birefringence with 45° azimuth of the fast axis. Consequently, if the polarities are chosen correctly, the ellipticity of the polarization of beam 26 is reduced. The control loop 36,37,41,43 varies $\theta_Y$ until the deviation $|Y|$ is a minimum, i.e. until the output polarization is linear. The azimuth of this state is corrected by the second control loop 36,37,40,42 in a completely analogous fashion until the azimuth deviation $|X|$ is minimized, i.e. until the polarization is horizontal. The required electronically, controllable adjustment of the output azimuth could be realized, for example, by elastically twisting the fiber along a short section 47, including the fiber end 11, through an angle that is proportional to the deviation X. The resulting circular birefringence could be used to restore the desired horizontal azimuth of polarization.

It is technically more convenient to keep the fiber end 11 fixed and to adjust the azimuth of the output polarization of beam 26 by a combination of linear birefringence effects, analogous to that of the control element 44,46. For this purpose, three such pressure elements 48,49 and 50,51 and 52,53 can be arranged along the final section 47 of the fiber, forming together the X control unit 42. In the two other pressure elements 48,49 and 50,51 of this unit the forces are acting along the same azimuthal direction (45°) as in the Y control unit 43. The forces in these outer two elements have equal magnitude and are chosen so that the pressed fiber sections in these elements act each like a quarterwave optical retarder due to the stress-induced birefringence. The center element 52,53 in the X control unit 42 is operated with a force $\theta_X$ whose direction is normal to the plane of the reference polarization. Equivalent to $\theta_Y$, the force $\theta_X$ is arranged as the sum of a sufficiently large bias force $\theta_X{}^\circ$ and of a second component that is proportional to the variable deviation X, amplified with the gain factor $v_X$ of the control amplifier 40.

When the control loops are switched on, the output polarization of beam 26 is automatically adjusted to a state with $X \approx 0$ and $Y \approx 0$. Some simple versions of polarimeter do not generate error signals directly proportional to the angular deviations X and Y, but rather proportional to sin 2X and sin 2Y, respectively. Such a polarimeter can be used, alternatively, in the control system 34. The control loops then settle at a state characterized by sin $2X \approx 0$ and sin $2Y \approx 0$. In that case, however, an ambiguity exists because the same characterization applies also the state exactly orthogonal to the desired reference state. A simple decision between the desired state and the orthogonal one is possible then with the help of the signal of the detector 31. If the loops settle at the wrong state, that signal is maximum and may be used to trigger a jump of the control loops to the correct state.

From FIGS. 2 and 3 the possibility is apparent to merge the two adjacent pressure elements 44,46 and 48,49 in the Y control unit 43 and in the X control unit 42, respectively, into a single control element whose bias force $\theta_Y{}^\circ$ is modified correspondingly.

Finally, the entire interferometer 10 of FIG. 1 is reconsidered. A particularly advantageous embodiment of a Sagnac interferometer for measuring rotation rates is obtained if the basic interferometer of FIG. 1 is appended by the parts shown in dashed lines: An auxiliary beamsplitter 54, an analyzer 56 and a detector 57, arranged as indicated in FIG. 1. Moreover, it is necessary for this embodiment to replace the main beamsplitter 20, originally assumed as lossless, by a beamsplitter with so-called phase-quadrature. Such beamsplitters have been described by K. W. Ranies and M. J. Downes in Optica Acta Vol. 25 (1978), p. 549. The output light fluxes 28 and 29 of such a beamsplitter vary proportional to sin 2 $\phi$ and cos 2 $\phi$, respectively. Such a behaviour is possible only with lossy beamsplitters. In a Sagnac interferometer appended in this fashion, the phase shift 2 $\phi$ characterizing the rotation rate can, therefore, be obtained simply by a comparison of the total light fluxes transmitted by the analyzers 16 and 56, provided they are both adjusted according to the instruction given earlier. In this arrangement, only two single detectors 30 and 57 are required instead of the detector arrays necessary to sample the geometrical configuration of a structured interference pattern. The ratio of the output signals of the detectors 30 and 57 is proportional to tan 2 $\phi$.

In all embodiments of the invention as described above, only polarization control units 42,43 have been considered that act with mechanical forces upon the fiber 23. It is apparent, however, that other elements can be used alternatively for the control of the polarization. In particular, electro-optic crystals are suitable whose birefringence can be controlled electronically by applying an electric field to the crystal. Such electro-optic elements for the polarization control are preferably arranged in the light path 20,23,20 at a position between the auxiliary beamsplitter 36 (shown in FIG. 2) and the fiber end 11.

It should be understood, that the arrangement of the polarizer 18 and of the analyzers 16 and 56 shown in FIG. 1 is not necessarily the only possible and advantageous one. Rather, a polarizer can be arranged between the main beamsplitter 20 and each of the fiber ends 11,12. They act as polarizers for the input light beams 13,14 to the fiber, and as analyzers for the output beams 26,27. An embodiment with such an arrangement of polarizers is particularly advantageous, because the conditions specified earlier in the instruction for the adjustment of the analyzers are satisfied here automatically for any azimuth of the two polarizers.

In the preceeding discussion, the optical fiber 23 had been tacitly assumed to be a so-called monomode fiber. Alternatively, the interferometer can also be equipped with a so-called multimode fiber. All the preceeding considerations of the polarization properties hold correspondingly in that case, provided that a mode filter is inserted at either end of the fiber. This filter must pass only a single spatial mode of the multimode fiber, preferably the fundamental mode.

Finally it should also be understood that the method of this invention can also be employed in embodiments using the technology of integrated optics. In those embodiments, the definition and maintenance of the states of polarization, required according to the invention, can be achieved advantageously by availing of the natural birefringence properties of integrated optical guides. Moreover, the polarization controlling elements can also be integrated in the form of electro-optical phase shifters. Likewise, the sensors for the polarization control can be realized in integrated optical form. Such integrated optical embodiments of the described Sagnac interferometer for the measurement of rotation rates should be considered as equivalent to the subject matter of this invention .

What we claim is:

1. A method for the measurement of rotation rates by the Sagnac effect in a light path encircling an area, employing two coherent light beams which are coupled into the two ends of said light path of which a section is subject to perturbations that affect the polarizations of said two light beams, which, after they emerge again from the ends of said fiber, are superimposed so that they interfere, the rotation rate of said light path being evaluated from an analysis of the interference, said method being characterized in that said two light beams are coupled with defined states of polarization into said light path of which a section is subject to perturbations, and that said two interfering beams pass through at least one polarization analyzer, azimuth and ellipticity of which are adjusted for maximum transmission of light which is the conjugate of one of said light beams coupled into said light path at one end thereof, characterized in that an automatic control system, responding to variations of polarization, is used to maintain a stable state of polarization of at least one of said two light beams emerging from said perturbed section of said light path, said stable state of polarization being distinctly different from that state which is blocked by said polarization-analyer.

2. The method according to claim 1, characterized in that the polarization states of the two interfering light beams coupled into that part of said light path which is subject to perturbations are states of linear polarization and that said polarization analyzer is adjusted for maximum transmission of light of that state of polarization which would result in the reflected light beams if said two light beams, instead of being coupled into the ends of said light path, of which a section is subject to perturbations, were reflected back into themselves by plane mirrors positioned at either end of said part of said light path which is subject to perturbations.

3. A method according to claim 1, in which that state of polarization which passes with maximum transmission through said polarization-analyzer, is maintained stable.

4. Method according to claim 3, in which the rotation rate is evaluated from normalized signals, said signals being formed as the ratio of detector signals characterizing said interference and detector signals characterizing the intensity of the source of said two coherent light beams.

5. Arrangement for the measurement of rotation rates according to the method as defined by one of the preceeding claims 1, 2, 3 or 4, employing a light path that encircles an area and a Sagnac interferometer that rotates at the rate to be measured, said light path being defined at least partially by an optical fiber, said arrangement being characterized in that at least one polarizer (18) is inserted in that part of said light path which leads from the light source (17) to both ends (11 and 12) of said fiber (23), and that a polarization-analyzer is provided in the path of said two interfering beams emerging from the ends of said fiber, azimuth and ellipticity of said analyzer being adjusted for maximum transmission of light which is the conjugate of one of said light beams coupled into said light path at one end thereof, and that an automatic control system is provided which responds to the state of polarization of one of said two interfering light beams which emerges from one end (11) of said fiber, said control system maintaining the polarization of said light beam (26) emerging from said fiber in a state which is distinctly different from the state which is blocked by said analyzer (16).

6. The arrangement according to claim 5, wherein the polarization states of the two interfering light beams coupled into that part of said light path which is subject to perturbations are states of linear polarization, further characterized in that said polarization analyzer is adjusted to select for the evaluation of the rotation rate that state of polarization which would result in the reflected light beams if said two light beams (13;14) instead of being coupled into the ends (11;12) of said light path, of which a section is subject to perturbations, were reflected back into themselves by plane mirrors positioned at either end of said part of said light path which is subject to perturbations.

7. The arrangement according to claim 6 in which said light beams (13;14) which are coupled into the ends of said fiber are polarized linearly and parallel to the plane defined by said superimposed and interfering beams, and said control system comprising a polarimeter (37) which receives a fraction of typically 10% of the power of said light beam emerging from said controlled fiber end, said fraction being split off from said light beam by an auxiliary beamsplitter (30) which is arranged between said controlled fiber end and the main beamsplitter (20), and said polarimeter generating a first error signal which characterizes the aximuthal deviation X of the measured state of polarization from the linear horizontal reference state of polarization, and said polarimeter generating a second error signal which characterizes the circular component Y of said measured state of polarization, and said second error signal (Y) controlling a first control unit (43) which induces in said fiber a birefringence which tends to compensate said circular component Y of the state of polarization of the light beam emerging from said fiber end, and said first error signal (X) controlling a second control unit (42) which induces in said fiber a birefringence which tends to compensate said azimuthal deviation X of said state of polarization.

8. The arrangement according to claim 7 in which said light beams coupled into said fiber are polarized linearly and normally to said plane.

9. The arrangement according to claim 8 in which said second control unit (42) which is controlled by said first error signal (X) of said polarimeter comprises at least two pressure devices (48,49 and 50,51 and 52,53) acting on said fiber, one of said pressure devices (50,51) exerting on said fiber a constant compressive transverse force whose direction forms an angle of 45° with said reference plane of polarization, said constant force imparting to the pressed section of said fiber the properties of a quarterwave retardation plate, and the other pressure device (52,53) exerting on said fiber a transverse compressive force $\theta X$ whose direction is parallel or normal to said reference plane of polarization, said force $\theta X$ being the sum of a constant bias force $\theta X°$ and of a force $vxX$ which varies in proportion to said first error signal (X).

10. The arrangement according to claim 5 in which the control system (33;34) comprises at least one control unit which modifies the birefringence of said fiber (23) near said end (11) at which said light beam emerges to whose state of polarization said control system responds, said control unit inducing a birefringence in said fiber (23) which results at said analyzer in a state of polarization which can pass at least partially said analyzer (16).

11. The arrangement according to claim 10 in which said control system stabilizes the state of polarization of said light beam (26) which emerges from the controlled end (11) of said fiber, said stabilized state of polarization being selected to be passed with maximum transmission by said analyzer (16).

12. The arrangement according to claim 11 in which said control system (34) generates two error signals which characterize two selected components of polarization of said light beam (26) emerging from said controlled end (11) of said fiber, and said control system comprising two control units (42;43) which are controlled by said two error signals, said two control units inducing in two adjacent sections of said fiber birefringence properties which have different eigenstates of polarization, and said selected components of polarization and said eigenstates of polarization all being different from the state of polarization blocked by said analyzer.

13. The arrangement according to claim 12 in which at least one polarization controlling element in said control units (42;43) is a pressure device (44–53) which exerts a transverse compressive force on said fiber, said force acting in a line which includes a defined angle with the plane of the linear reference state of polarization, and said force depending linearly on the controlling error signal.

14. The arrangement according to claim 13 in which said first control unit, which is controlled by said second error signal (Y) of said polarimeter (37), comprises a pressure device in which the direction of the force $\theta_Y$ includes an angle of 45° with said plane of said reference polarization, said force being the sum of a constant bias force $\theta_{Y^*}$ and of a force $\nu \cdot Y$ which varies in proportion to said second error signal (Y).

15. The arrangement according to in which a beamsplitter (20) is employed for which the intensities of the two output light beams (28;29) vary approximately in quadrature, and in which an auxiliary beamsplitter (54) is provided which splits off a fraction of the light flux which results from the superposition of said two interfering beams and which is travelling back toward the light source (17), said split-off fraction being directed through a second polarization analyzer (56) onto a detector (57), said second analyzer selecting for the evaluation of the rotation rate a state of polarization of said light beams (26; 27) emerging from said ends of the fiber, said selected state of polarization being equal to the state selected by said first analyzer (16).

16. The arrangement according to claim 5 in which a linear polarizer is provided in each of the light paths leading from the main beamsplitter (20) to said two ends of said fiber (23), said linear polarizers being adjusted to have the same azimuthal orientation relative to the plane which is defined by the two coherent beams (13,14) travelling from the main beamsplitter to said fiber ends.

* * * * *